US008967797B2

(12) United States Patent
Kurtin

(10) Patent No.: US 8,967,797 B2
(45) Date of Patent: *Mar. 3, 2015

(54) ADJUSTABLE FOCUS SPECTACLES

(71) Applicant: Zoom Focus Eyewear, LLC, Sherman Oaks, CA (US)

(72) Inventor: Stephen Kurtin, Sherman Oaks, CA (US)

(73) Assignee: Superfocus Holdings LLC, Beverly Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/470,884

(22) Filed: Aug. 27, 2014

(65) Prior Publication Data

US 2014/0368786 A1  Dec. 18, 2014

Related U.S. Application Data

(63) Continuation of application No. 14/251,151, filed on Apr. 11, 2014, which is a continuation of application No. 14/018,186, filed on Sep. 4, 2013, now Pat. No. 8,708,487, which is a continuation of application No. 12/928,241, filed on Dec. 6, 2010, now Pat. No. 8,777,408.

(51) Int. Cl.
| | |
|---|---|
| *G02C 7/02* | (2006.01) |
| *G02B 3/14* | (2006.01) |
| *G02C 7/08* | (2006.01) |
| *G02C 7/06* | (2006.01) |
| *G02C 5/00* | (2006.01) |
| *G02C 5/22* | (2006.01) |

(52) U.S. Cl.
CPC *G02C 7/085* (2013.01); *G02C 7/06* (2013.01); *G02C 7/088* (2013.01); *G02C 5/001* (2013.01); *G02C 5/22* (2013.01); *G02B 3/14* (2013.01)
USPC .................. 351/159.68; 351/140; 359/666

(58) Field of Classification Search
CPC ......... G02C 7/085; G02C 5/2281; G02C 5/22
USPC .................. 351/159.68, 140; 359/665–667
See application file for complete search history.

(56) References Cited

U.S. PATENT DOCUMENTS

| | | | |
|---|---|---|---|
| 1,269,422 | A | 6/1918 | Gordon |
| 4,300,818 | A | 11/1981 | Schachar |
| 4,890,903 | A | 1/1990 | Treisman et al. |
| 5,138,494 | A | 8/1992 | Kurtin |
| 5,440,357 | A | 8/1995 | Quaglia |
| 5,526,067 | A | 6/1996 | Cronin et al. |
| 5,665,275 | A | 9/1997 | Kobayashi et al. |

(Continued)

OTHER PUBLICATIONS

International Search Report in the parent PCT application No. PCT/US11/63205, dated Mar. 20, 2012.

(Continued)

*Primary Examiner* — Zachary Wilkes
(74) *Attorney, Agent, or Firm* — Chen Yoshimura LLP

(57) ABSTRACT

Adjustable focus eyeglasses where the range of adjustment can be moved. That is, if a pair of adjustable focus eyeglasses have a range of 0 diopters to 2.75 diopters (to provide a 2.75 D ADD for reading for an emmetrope), this invention could, for example, permit the user to move the range from 0 D to 2.75 D to 2.00 D to 4.75 D so as to accommodate a short term change in the user's distance vision requirement. Each eye can be adjusted independently.

17 Claims, 2 Drawing Sheets

(56) References Cited

U.S. PATENT DOCUMENTS

| | | |
|---|---|---|
| 5,684,637 A | 11/1997 | Floyd |
| 5,956,183 A | 9/1999 | Epstein et al. |
| 6,715,876 B2 | 4/2004 | Floyd |
| 7,142,369 B2 * | 11/2006 | Wu et al. ............ 359/666 |
| 8,002,403 B2 | 8/2011 | Silver et al. |
| 2008/0084532 A1 | 4/2008 | Kurtin |

OTHER PUBLICATIONS

IPRP in the in the parent PCT application No. PCT/US11/63205, dated Mar. 20, 2012.

* cited by examiner

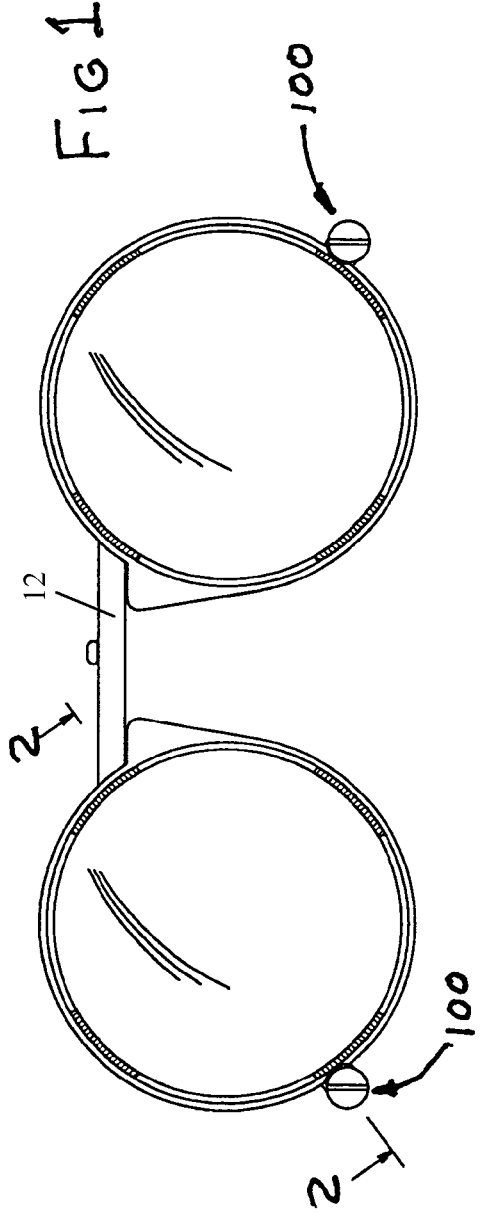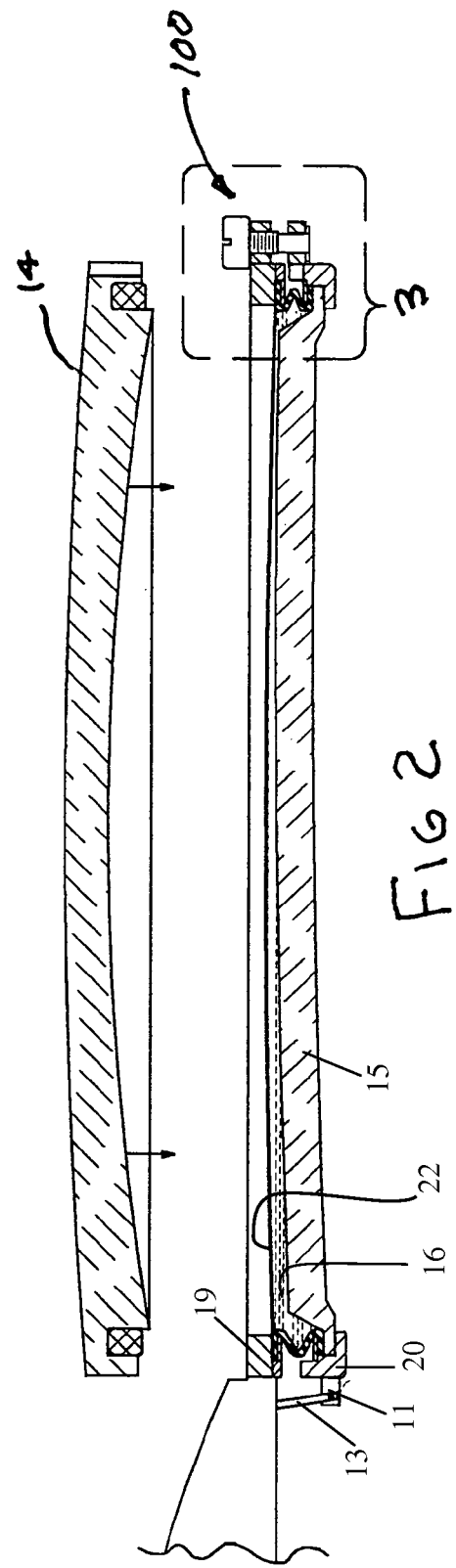

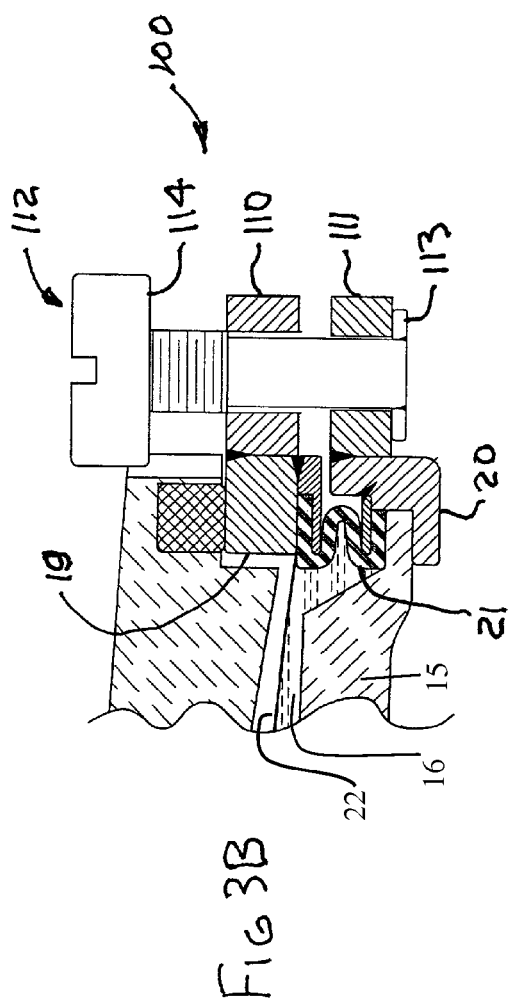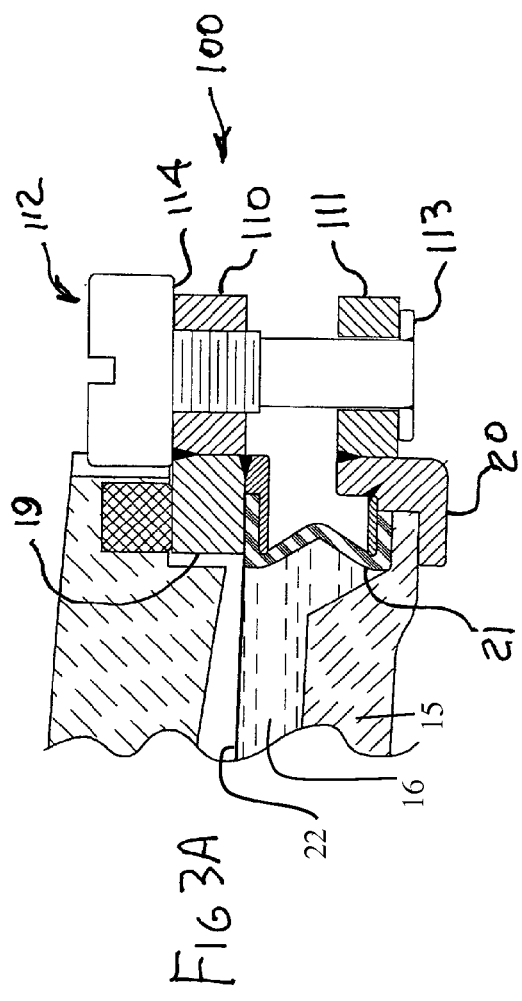

ADJUSTABLE FOCUS SPECTACLES

BACKGROUND

Good human vision depends upon properly focusing light incident on the front of the eye onto the retina. To this end the human eye includes an internal lens, and muscles that exert forces on that lens. In youth these muscles can change substantively the focal length of the internal lens, thereby enabling focusing on objects at various distances. With increasing age the ability of these muscles to affect focus decreases until, after about forty-five, most people can no longer focus at both far and near . . . even after any innate hyperopia, or myopia, and/or astigmatism is corrected. Optometrically speaking, people evidencing this condition are called 'presbyopes'.

Variable focus eyeglasses have been devised that enable a presbyopic wearer manually to adjust focal length, and thereby to focus—on demand—at any distance. See Kurtin, U.S. Pat. Nos. 5,138,494 and 5,668,620 and US Patent Application Publication No. 2008/0084532. The eyeglasses disclosed in the aforementioned patents typically include a) for each eye a fixed optical power equal to the intended wearer's required refractive correction for far vision, together with b) a manually adjustable, bilaterally tracking, spherical ADD power. The maximum ADD can, in some instances, be as large as about 2.75 diopters, which amount is sufficient to permit a change in focus from far viewing to somewhat closer than 'reading distance' (usually assumed to be about 16 inches). Emerging presbyopes {those who retain some natural focusing ability} usually require a lesser amount of maximum ADD.

Adjustable focus eyeglasses as just described will suit most presbyopes. Some, however, suffer also from fluctuating vision. This means that the spherical optical power required to correct their far vision varies from time to time (i.e., from hour to hour, or from day to day). Fluctuating vision can arise as a consequence, for example, of diabetes, dry eye, hyperthyroidism, menopause, or possibly other conditions.

While statistically comprehensive information is seemingly not available, published clinical data indicates that in many instances the fluctuation is primarily as to sphere, and can exceed two diopters. More to the point, when an individual with fluctuating vision presents him- or herself for a refraction there is often no conclusive way in which the optometric practitioner can be confident as to i) the relevant range of fluctuation, ii) whether or not that range is static, and iii) where within that range the patient's vision is just then situated. Hence what is needed is eyeglasses which will allow the user, from time to time, to modify his/her spherical refractive correction to offset corresponding biological fluctuations.

SUMMARY OF THE INVENTION

This application describes an eyeglass invention which allows its user to update (as to each eye separately), from time to time, his/her spherical refractive correction for far vision. For convenience the invention is described in connection with eyeglasses of the type disclosed in US Patent Application Publication No. 2008/0084532. These previously disclosed glasses are primarily intended for use by conventional presbyopes. The underlying technology can, however, via the invention described herein, be modified to be suitable for i) additionally, or ii) alternatively, compensating for fluctuating vision. Accordingly, the disclosures of that publication are incorporated herein by reference.

For use by presbyopes with fluctuating vision the preferred embodiment disclosed here includes actuator means (located in the bridge of the glasses) whereby bilateral ADD can be adjusted by the user [in addition to, and separately from, the each-eye-separately correction for fluctuating vision which is the subject of this invention]. If the user is not presbyopic it will not be necessary to include this actuator. In any event, said actuator is described in US Patent Application Publication No. 2008/0084532.

The invention can also be applied to other variable focus eyeglasses, but the one discussed herein is the presently preferred embodiment.

The variable lens described in US Patent Application Publication No. 2008/0084532 includes a rigid lens (referred to as the "rear" lens) spaced away from a distensible membrane, the intervening space being filled with a transparent optical liquid. Both the rigid lens and the membrane are held by spaced rings (which, in the preferred embodiment, are circular). A flexible sealing member in the space between the rings keeps the optical liquid from escaping. The inter-ring spacing at a point near the bridge is varied by an actuator located within the bridge, and the inter-ring spacing at a point substantially opposite said point near the bridge is set by a leaf hinge. If said inter-ring spacing near the bridge is changed, a portion of the optical liquid is displaced . . . thereby forcing the membrane incrementally either to bulge or to recede, and correspondingly increasing or decreasing the optical power of the lens. If the portion of the membrane that is free to bulge/recede is circular, and its boundary is flat, the resulting optical power will be essentially spherical.

In the present invention the leaf hinge mentioned above is replaced by a hinge means with controllable axial length ('H/CAL') which can be manually set by the wearer. Consequently, as further described below, by setting the axial length of each H/CAL the baseline sphere optical power provided to each eye can be altered in a controlled manner (for example, by up to approximately ±1.4 diopters). Accordingly, said hinge means together with directly related items are sometimes herein called a 'fluctuating vision compensation mechanism'.

Operation of the fluctuating vision compensation mechanism can be understood as follows: 1) whenever the H/CAL is caused to alter the inter-ring spacing it controls, the volume between the front and rear rings will change correspondingly; 2) the optical liquid, having a constant volume, will thereupon cause the distensible membrane to incrementally bulge or recede; and 3) the baseline optical power of the lens will thereby change [e.g., by up to approximately ±1.4 diopters].

For embodiments including an actuator, the amount of bilateral ADD, as determined by adjusting the actuator and hence by further displacing of optical liquid, will—for both eyes—increment the optical power set by the H/CAL.

Accordingly the invention is expected, for example, to be used as follows:

i) An individual presents him/herself for refraction. Assuming that there is no basis on which the practitioner can assess the then-current effect of fluctuating vision, the resulting refraction is identified as 'Clinical Refraction 1' (CR1), and is taken as nominal.

ii) Front Lenses 14 are prescribed, each with the sphere power per CR1 less some offset. For example, assuming an implementation of the invention offering 2.75 diopter of fluctuation correction, for purposes of clear description we shall assume an initial Front Lens sphere power offset of −1.375 diopter. In this manner, when the H/CAL is set to mid travel . . . and therefore provides +1.375 D of counter-offset . . . the user will enjoy far vision per CR1, thereby correcting i) any astigmatic and/or manifest prismatic error, as well as ii) his/her nominal spherical error.

iii) From time to time; as his/her vision fluctuates, with the actuator set for far vision the user will notice that his far vision is no longer sharp. Thereupon the user can, separately for each eye, simply by directing his gaze to a distant object and modifying the setting of the H/CAL, dial in sharp vision.

iv) If CR1 was, by happenstance, in fact nominal—or if the extent of the user's vision fluctuation is sufficiently moderate—no further action need be taken. If not, then the user will find that on occasion he runs out {in either the positive, or negative, direction} of the ability adequately to offset his/her vision fluctuation. On so reporting to his/her practitioner, by modifying the specified offset to CR1 more appropriate front lenses can be prescribed . . . thereby allowing the vision fluctuation correction provided by the invention to be better utilized.

DESCRIPTION OF THE FIGURES

FIG. 1 is a front view of a pair of eyeglasses according to the present invention.

FIG. 2 is a partially exploded cross sectional view of one of the lens units of the glasses of FIG. 1, taken at 2-2 of FIG. 1.

FIG. 3A is an enlarged view of that portion of the cross section of FIG. 2 indicated by the numeral '3'. FIG. 3A shows the H/CAL set to provide minimum sphere optical power.

FIG. 3B is similar to FIG. 3A except that the H/CAL is set to provide maximum sphere optical power.

DESCRIPTION OF AN EMBODIMENT OF THE INVENTION

The invented fluctuating vision compensation mechanism is shown herein as applied to a pair of variable focus spectacles similar to those described in Patent Application Publication 2008/0084532. For convenience, each component that also appears in the patent publication is shown having the same identification number as in that publication, including, in particular, the distensible membrane 22, the transparent optical liquid 16, rear lens 15, bridge 12, the actuator link 13, and the tab 11 of the rear ring 20. The link 13, which is a part of the above-mentioned actuator, pushes the tab 11 to accomplish a change of the inter-ring spacing at a point near the bridge as described earlier. Components that are unique to the fluctuating vision compensation mechanism are given numbers over 100.

FIG. 1 shows two fluctuating vision compensation mechanisms 100 incorporated in a pair of preferred embodiment variable focus spectacles. One mechanism is incorporated in each lens unit in place of the leaf hinge that would otherwise be present (i.e., approximately opposite the actuation point of the actuator). The mechanisms are shown with a slotted round head, as for adjustment with a screwdriver. Other types of heads, such as hex heads, internal sockets, and heads suitable for grasping by the fingers, would be satisfactory alternatives. Enlarged sectional views of the mechanism are shown in FIGS. 3A and 3B. FIG. 3A shows the mechanism set to provide minimum optical sphere, whereas FIG. 3B shows the mechanism set to provide maximum optical sphere.

In this embodiment the mechanisms are attached by means of a front tab 110 and a rear tab 111, welded to the front ring 19 and rear ring 20 respectively. Controllable spacing screw 112 is threaded to match a tapped hole in the front tab, and is turned down at its end to match a hole in the rear tab. This assemblage forms a connector connecting the front ring 19 to rear ring 20. The threads of screw 112 are made somewhat loose, allowing angular motion between the front and rear rings. Retainer 113, welded at the end of controllable spacing screw 112, keeps this screw from coming out of tab 111. Additionally, the thread length of screw 112 is preferably kept short enough that the screw disengages from tab 110 before any interference occurs between the front and rear ring assemblies. And also, as to rotation of the screw in the other direction, the bottom of the screw head 114 bottoms on tab 110 to limit its travel.

As to embodiments with an actuator means, when said actuator is moved the front tab 110 and rear tab 111 move angularly about screw 112 as a pivot; for this reason the screw threads and/or the fit of the screw body into the hole in rear tab 111 must be loose enough to allow adequate unimpeded angular motion. Accordingly it is further preferred that the lens unit be filled such that its internal pressure is positive when the front and rear rings are at their maximum separation.

In the present figures screw 112 is shown at a circumferential location corresponding to the filling location in US Patent Application Publication No. 2008/0084532. Hence, for convenience, in the present invention filling is preferably accomplished by injecting optical liquid through the wall of the sealing member at a somewhat different, but nearby, location. Additionally, since in use the spacing between the front and rear rings (19 and 20) is expected to vary from time to time at each point around the periphery of the lens unit, the bellows 21 preferably has a substantially bellows shape at each section; and hence, unlike as shown in Publication No. 2008/0084532, the sealing member will not have a solid portion at the filling location.

An alternate embodiment of the invention (not illustrated) could be comprised of a flexure [substituted for the leaf hinge in the referenced patent publication], the active length of which is controlled by a slider.

I claim:
1. Variable focus spectacles comprising first and second lens units, each lens unit comprising:
   a transparent member;
   a membrane support structure, having an opening therein, being disposed adjacent to and within a field of view of the transparent member, the membrane support structure being manually movable by a wearer of the variable focus spectacles to change a distance between the membrane support structure with respect to the transparent member at one location around a periphery of the membrane support structure, while at another location around the periphery of the membrane support structure, a distance between the membrane support structure and the transparent member is maintained substantially constant;
   a transparent membrane attached to the membrane support structure across the opening;
   a flexible seal extending between the transparent member and the membrane support structure, the flexible seal permitting motion between the transparent member and the membrane support structure; and
   liquid having a predetermined index of refraction substantially filling a space between the transparent member and the membrane support structure within the seal,
   wherein the membrane support structures of the first and second lens units are independently moveable by the wearer to independently change the respective distances between the respective membrane support structures with respect to the corresponding transparent members at the respective one locations.

2. The variable focus spectacles of claim 1, further comprising a bridge disposed between the first and second lens units, the bridge being connected to the first lens unit at a first bridge support location and connected to the second lens unit at a second bridge support location, wherein the one locations around the periphery of the membrane support structure in the first and second lens units are spaced apart from the first and second bridge support locations, respectively.

3. Variable focus spectacles comprising first and second lens units, each lens unit comprising:
 a transparent member;
 a membrane support structure, having an opening therein, being disposed adjacent to and within a field of view of the transparent member;
 a transparent membrane attached to the membrane support structure across the opening;
 a flexible seal extending between the transparent member and the membrane support structure, the flexible seal permitting motion between the transparent member and the membrane support structure;
 liquid having a predetermined index of refraction substantially filling a space between the transparent member and the membrane support structure within the seal; and
 an adjustable element allowing adjustment of a distance between the transparent member and the membrane support structure at one location around a periphery of the membrane support structure while, at another location along the periphery of the membrane support structure, a distance between the transparent member and the membrane support structure is kept unchanged,
 wherein the adjustable elements of the first and second lens units are manually adjustable independently of each other to allow independent adjustments of the respective distances between the respective transparent members and the corresponding membrane support structures at the respective one locations.

4. The variable focus spectacles of claim 3, wherein the adjustable element is coupled directly or indirectly to the membrane support structure.

5. The variable focus spectacles of claim 3, wherein the adjustable element is coupled directly or indirectly to the transparent member.

6. The variable focus spectacles of claim 3, wherein the adjustable element has an inclined ramp.

7. The variable focus spectacles of claim 3, further comprising a bridge disposed between the first and second lens units, the bridge being connected to the first and second lens units at first and second bridge support locations, wherein the one locations around the periphery of the membrane support structure in the first and second lens units are spaced apart from the first and second bridge support locations, respectively.

8. The variable focus spectacles of claim 3, wherein the adjustable element has a first part that is coupled directly or indirectly to the transparent member, a second part that is coupled directly or indirectly to the membrane support structure, and a third part that is in moveable contact with either the first part or the second part, and wherein a movement of the third part relative to one or both of the first part and the second part causes adjustment of the distance between the transparent member and the membrane support structure at the one location.

9. Variable focus spectacles comprising first and second lens units, each lens unit comprising:
 a transparent member;
 a membrane support structure, having an opening therein, being disposed adjacent to and within a field of view of the transparent member;
 a transparent membrane attached to the membrane support structure across the opening;
 a flexible seal extending between the transparent member and the membrane support structure, the flexible seal permitting motion between the transparent member and the membrane support structure;
 liquid having a predetermined index of refraction substantially filling a space between the transparent members and the membrane support structure within the seal; and
 an adjustable mechanism having a first part that is coupled directly or indirectly to the membrane support structure and a second part that is in moveable contact with the first part, wherein a movement of the second part relative to the first part changes a distance between the transparent member and the membrane support structure at one location around a periphery of the membrane support structure while, at another location along the periphery of the membrane support structure, a distance between the transparent member and the membrane support structure is kept unchanged,
 wherein the second parts of the adjustable mechanisms of the first and second lens units are manually adjustable independently of each other to independently change the respective distances between the respective transparent members and the corresponding membrane support structures at the respective one locations.

10. The variable focus spectacles of claim 9, wherein the second part includes an inclined ramp in slidable contact with the first part.

11. The variable focus spectacles of claim 9, wherein the adjustable mechanism further includes a third part that is coupled directly or indirectly to the transparent member, wherein the second part is in moveable contact with the third part, wherein a movement of the second part relative to the third part changes the distance between the transparent member and the membrane support structure at the one location while, at the other location along the periphery of the membrane support structure, the distance between the transparent member and the membrane support structure is kept unchanged.

12. The variable focus spectacles of claim 11, wherein the third part of the adjustable mechanism includes a ring structure which is disposed around and holds the transparent member.

13. The variable focus spectacles of claim 11, wherein the second part of the adjustable mechanism is in slidable contact with both the first part and the second part.

14. The variable focus spectacles of claim 11, wherein the second part includes an inclined ramp in slidable contact with either the first part or the second part.

15. Variable focus spectacles comprising first and second lens units, each lens unit comprising:
 a transparent member;
 a membrane support structure, having an opening therein, being disposed adjacent to and within the field of view of the transparent member;
 a transparent membrane attached to the membrane support structure across the opening;
 a flexible seal extending between the transparent member and the membrane support structure, the flexible seal permitting motion between the transparent member and the membrane support structure;

liquid having a predetermined index of refraction substantially filling a space between the transparent members and the membrane support structure within the seal; and a controllable spacing member coupled directly or indirectly to each of the transparent member and the membrane support structure, the controllable spacing member being operative to control a distance between the transparent member and the membrane support structure at one location along a periphery of the transparent member and the membrane support structure, while a distance between the transparent member and the membrane support structure at another location along the periphery of the transparent member and the membrane support structure is kept constant, wherein the controllable spacing members of the first and second lens units are manually operable independently of each other to independently control the respective distances between the respective transparent members and the corresponding membrane support structures at the respective one locations.

16. The variable focus spectacles of claim 15, wherein the controllable spacing member includes an inclined ramp, the inclined ramp being operative to change a direction of motion imparted by a movement of the controllable spacing member to either the transparent member or the membrane support structure.

17. The variable focus spectacles of claim 16, wherein the inclined ramp is in the form of threads of a screw.

* * * * *